United States Patent
Pines et al.

(10) Patent No.: US 9,699,388 B2
(45) Date of Patent: *Jul. 4, 2017

(54) METHOD, APPARATUS AND SYSTEM FOR PROVIDING REPRODUCIBLE DIGITAL IMAGERY PRODUCTS

(75) Inventors: Joshua Pines, San Francisco, CA (US); Chris Kutcka, Pasadena, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 1470 days.

This patent is subject to a terminal disclaimer.

(21) Appl. No.: 12/086,512

(22) PCT Filed: May 25, 2006

(86) PCT No.: PCT/US2006/020424
§ 371 (c)(1),
(2), (4) Date: Jun. 13, 2008

(87) PCT Pub. No.: WO2007/070088
PCT Pub. Date: Jun. 21, 2007

(65) Prior Publication Data
US 2010/0220971 A1    Sep. 2, 2010

Related U.S. Application Data

(60) Provisional application No. 60/751,021, filed on Dec. 16, 2005.

(51) Int. Cl.
*H04N 5/14*   (2006.01)
*H04N 9/64*   (2006.01)
(Continued)

(52) U.S. Cl.
CPC .................................. *H04N 5/253* (2013.01)

(58) Field of Classification Search
CPC ............. H04N 3/36; H04N 5/253; H04N 9/11
See application file for complete search history.

(56) References Cited

U.S. PATENT DOCUMENTS

| | | |
|---|---|---|
| 4,492,457 A | 1/1985 | Kawada et al. |
| 5,003,379 A | 3/1991 | Moore et al. |

(Continued)

FOREIGN PATENT DOCUMENTS

| | | |
|---|---|---|
| CN | 1302045 | 7/2001 |
| CN | 1167036 | 9/2004 |

(Continued)

OTHER PUBLICATIONS

Bogdanowicz et al., "Interface of Motion-Picture Films and Video", SMPTE Journal, Jun. 1986, pp. 614-623.

(Continued)

*Primary Examiner* — Kyu Chae
(74) *Attorney, Agent, or Firm* — Brian J. Dorini; Lily Neff

(57) ABSTRACT

The present invention provides a method, apparatus and system for providing reproducible digital imagery products from captured image content and for the color correction of the reproducible digital imagery products. In one embodiment, the present invention provides a log video signal comprising at least density values for the contrast levels of the original image content for enabling a quantitative assessment of the image content information for providing repeatable and reproducible values from which a cinematographer/director of photography could order the color correction or adjustment of the image content in a reproducible manner understood device by a color correction specialist or "timer".

18 Claims, 6 Drawing Sheets

(51) Int. Cl.
*H04N 5/222* (2006.01)
*H04N 5/765* (2006.01)
*H04N 5/253* (2006.01)

(56) References Cited

U.S. PATENT DOCUMENTS

| | | | |
|---|---|---|---|
| 5,121,159 A | 6/1992 | Ujiie | |
| 5,208,903 A * | 5/1993 | Curry | G06F 3/0481 345/594 |
| 5,255,083 A | 10/1993 | Capitant et al. | |
| 5,387,929 A | 2/1995 | Collier | |
| 5,500,316 A | 3/1996 | Bogdanowicz et al. | |
| 5,574,659 A | 11/1996 | Delvers et al. | |
| 5,750,320 A | 5/1998 | Bogdanowicz et al. | |
| 5,874,988 A * | 2/1999 | Gu | 348/97 |
| 6,115,062 A * | 9/2000 | Milson et al. | 348/96 |
| 6,271,908 B1 * | 8/2001 | Brett et al. | 355/40 |
| 6,304,730 B1 | 10/2001 | Fant et al. | |
| 6,750,901 B1 | 6/2004 | Silverbrook | |
| 6,845,178 B1 | 1/2005 | Evans et al. | |
| 6,849,366 B1 | 2/2005 | Nirgudkar | |
| 6,924,839 B2 | 8/2005 | Eiho et al. | |
| 6,987,586 B2 | 1/2006 | Bogdanowicz et al. | |
| 7,133,070 B2 | 11/2006 | Wheeler et al. | |
| 2001/0022622 A1 | 9/2001 | Eiho et al. | |
| 2002/0130952 A1 | 9/2002 | Galt et al. | |
| 2002/0149679 A1 | 10/2002 | Deangelis et al. | |
| 2002/0163657 A1 | 11/2002 | Bogdanowicz et al. | |
| 2003/0026494 A1 | 2/2003 | Woodell et al. | |
| 2003/0081117 A1 | 5/2003 | Bogdanowicz et al. | |
| 2003/0081118 A1 * | 5/2003 | Cirulli et al. | 348/104 |
| 2003/0081177 A1 * | 5/2003 | Rosen | 352/38 |
| 2003/0095197 A1 | 5/2003 | Wheeler et al. | |
| 2003/0095199 A1 | 5/2003 | Senda | |
| 2003/0112412 A1 | 6/2003 | Han et al. | |
| 2004/0109059 A1 | 6/2004 | Kawakita | |
| 2004/0150641 A1 | 8/2004 | Duiker | |
| 2005/0134801 A1 * | 6/2005 | Bogdanowicz et al. | 352/38 |
| 2005/0179775 A1 | 8/2005 | Rodriguez et al. | |
| 2005/0280842 A1 | 12/2005 | Rodriguez et al. | |
| 2006/0007460 A1 * | 1/2006 | Bogdanowicz et al. | 358/1.9 |
| 2006/0013477 A1 * | 1/2006 | Pellar | H04N 1/6027 382/162 |
| 2009/0086100 A1 * | 4/2009 | Pines et al. | 348/624 |

FOREIGN PATENT DOCUMENTS

| | | |
|---|---|---|
| DE | 19714886 | 11/1997 |
| EP | 0987880 | 3/2000 |
| EP | 1103852 | 5/2001 |
| EP | 1237379 | 9/2002 |
| EP | 1239668 | 9/2002 |
| EP | 1307045 | 5/2003 |
| GB | 2304932 | 3/1997 |
| GB | 2307819 | 6/1997 |
| JP | 5260500 | 10/1993 |
| JP | 6217193 | 8/1994 |
| JP | 09247316 | 9/1997 |
| JP | 200151354 | 2/2001 |
| JP | 200178090 | 3/2001 |
| JP | 2001078090 | 3/2001 |
| JP | 2001305870 | 11/2001 |
| JP | 2002135589 | 5/2002 |
| JP | 2002374541 | 12/2002 |
| WO | WO-9826583 | 6/1998 |
| WO | WO9960524 | 11/1999 |

OTHER PUBLICATIONS

Markie et al., "The Interface of Color Negative Film and Telecine", SMPTE Journal, Mar. 1983, pp. 303-307.
Reinking et al., "Eastman Color High-Speed Negative Film 7292", SMPTE Journal, Sep. 1986, pp. 870-873.
International Search Report, dated Nov. 7, 2006.
Shaw Kevin: "Digital Intermediates: Selecting a Video or Data Workflow" finalcolor inc., Jan. 2005.
Shaw Steve: Digital Dailies and DI, published Aug. 11, 2005, at website:http://cinematography.net/edited-pages/Digital_Dailies_andDI.htm, pp. 1-3, Digital Praxis Ltd.
Lee, "Digitally Controlled Equalizer", Konsumelektronik, Equalizer Concepts, pp. 1-13, Nov. 11, 2007.
Staes, et al. "The interface of color negative film and telecine," SMPTE Journal 92.3 (1983 303-307.

* cited by examiner

METHOD, APPARATUS AND SYSTEM FOR PROVIDING REPRODUCIBLE DIGITAL IMAGERY PRODUCTS

CROSS-REFERENCE TO RELATED APPLICATIONS

This application claims the benefit, under 35 U.S.C. §365 of International Application PCT/US2006/020424 filed May 25, 2006, which was published in accordance with PCT Article 21(2) on Jun. 21, 2007 in English and which claims the benefit of U.S. provisional patent application No. 60/751,021, filed Dec. 16, 2005.

FIELD OF THE INVENTION

The present invention generally relates to digital imagery and, more particularly, to a method, apparatus and system for providing reproducible digital imagery products from captured image content and for the color correction of the reproducible digital imagery products.

BACKGROUND OF THE INVENTION

In the motion picture industry an original motion picture negative film is exposed during a camera exposure operation, developed into a processed camera negative and subsequently operated upon in one of several ways to produce an imagery product. In prior art analog systems, film dailies or rushes were conventionally produced as a motion picture was shot. These dailies or rushes were processed and then viewed by the director, the producer, the film editor, etc. working on the production to determine whether the scenes shot were acceptable. Each person on the production team assessed the dailies for different elements relevant to their respective roles in the team. That is, dailies or rushes were printed on film. The cinematographers and directors could see the results of the previous day's work in a format that faithfully "previewed" what the final release would look like. A language developed between cinematographers and the "timer" at a lab where a director of photography (dp) could either literally dictate the color exposure intervals (e.g., lites), and hence the look of the dailies. Alternatively, assuming a relationship of trust which existed between the dp and the timer, the timer would choose the lites based on discussions with the dp, and the dp could verify, based on these lites, that the exposure was correct and that enough latitude was present on the negative for future color correction during the answer print process.

More specifically, with the dailies, "Printer Lite" information was provided which assisted the cinematographer/director of photography to determine whether the scenes were shot with a satisfactory exposure. This Printer Light information was determined from the settings of a conventional motion picture film printer required to produce a print with densities aimed at a specific laboratory. This information was obtained by passing white light from a scene through dichroic filters to split the light into its three components, red, green and blue. The three light components were used to expose a test film strip from which the densities corresponding to the intensities of the red, green and blue components of the light could be measured and compared with standard densities which correspond to an "ideal" exposure. The densities produced by the red, green and blue light components on the test film strip gave an indication of the exposure given to the original film as the scene was recorded. The "Printer Light" information provided repeatable and reproducible values from which a cinematographer/director of photography could order the color correction of the film in a manner understood by a color correction specialist (colorist) or "timer".

Today, however, there is an increasing demand for motion picture negative film to be transferred to video, and the film is never printed as such, as most film programs made specifically for television, for example, episodic shows, movies of the week and commercials, are transferred to video tape prior to showing.

Telecine machines enable this transfer to be achieved. That is, color negative film information (from a camera negative) or the color print film information (from an interpositive) is transferred into a video signal using a telecine transfer device in a telecine scanning process. As with the optical process, the interpositive is a negative copying material that is used to produce a positive-copy with the same contrast as the original negative and the same extended range of the scene. This element is then used in the trade as the element to scan on the telecine transfer device without risking harm to the original negative.

Telecine devices scan each negative or positive film frame transforming the transmittance at each pixel of an image into an electrical signal (e.g., a voltage). The signal processing then inverts the electrical signal in the case of a transfer made from a negative film in order to render a positive image, making a positive photographic print and then transferring the print film information into a video signal. The signal is carefully amplified and modulated, and fed into a cathode ray tube monitor to display the image. The signal can also be recorded onto magnetic tape for storage in, for example, a recording stage.

The output of the telecine transfer process finds a number of imagery applications. For example, video dailies are replacing the film dailies or rushes and non-linear editing techniques are replacing conventional film editing. The output of the telecine scanning process may be applied to a film recording stage, which produces a negative film that can be optically printed out as a release print. Ordinarily, a colorist operates a telecine transfer device by adjusting the telecine settings, which include gain, gamma, lift, illumination, matching whites, and matching blacks, to allow for the scene to be captured on the video tape correctly. The amount of latitude in setting up the telecine controls can cause clipping of data as well as viewing of a flat image on the monitor. The colorist may then have to color grade each scene, spending more telecine time and consequently adding more expense to the production job. That is, there are several drawbacks of this current practise. First of all, the dp has little control over the look of the dailies. Secondly, there is no "language" of printer lites or describable quantities to inform the dp how the negative was exposed and how much latitude exists for future correction.

More specifically, a major drawback of all these video applications is that the video signal resulting from the telecine transfer process has to be custom processed for each application. That is, an acceptable scene reproduction is obtained from dailies created on a trial-and-error basis, which is generally time-consuming. In case the cinematographer is not pleased with the scene look on the daily, the whole process is then repeated, starting with new adjustments and ending with another telecine transfer, until the desired look is obtained. Besides being time consuming, this is a relatively expensive process. Also, the telecine transfer method typically does not offer a quantitative assessment of the film system exposure information and does not provide, as in prior art systems, repeatable and reproducible values from which a cinematographer/director of photography could order the color correction of the film in a manner understood by a color correction specialist or "timer".

In addition, these days there is also an increasing move toward the digital filming of content made for theatre programming. As such, color correction as described above, cannot not be performed on such content intended to be viewed in a theatre. With such digital filming systems, a sequence of motion images is captured using a full resolution image sensor system, resulting in a captured sequence of full resolution unprocessed image signals corresponding to the motion images. The full resolution unprocessed image signals are recorded and provided to a post-production process where the images will be subsequently rendered in a post-processing stage to simulate a particular look for producing, for example, video dailies. More specifically, video dailies are replacing the film dailies or rushes and non-linear editing techniques are replacing conventional film editing. The post processing of the digitally captured images include adjusting gain, gamma, lift, illumination, matching whites, and matching blacks, to allow for the scene to be captured on the video tape correctly. A colorist may then have to color grade each scene, spending more processing time and consequently adding more expense to the production job. That is, there are several drawbacks of this current practise. First of all, the director of photography (dp) has little control over the look of the dailies. Secondly, there is no "language" of printer lites or describable quantities to inform the dp how the images were captured and how much latitude exists for future correction.

More specifically, a major drawback in all these digital capture applications is that the resulting digital images have to be custom processed for each application. That is, an acceptable scene reproduction is obtained from dailies created on a trial-and-error basis, which is generally time-consuming. In case the cinematographer is not pleased with the scene look on the daily, the whole process is then repeated, starting with new adjustments and ending with another post production process, until the desired look is obtained. Besides being time consuming, this is also a relatively expensive process. Also, the digital post production processing method also does not offer a quantitative assessment of the digital capture information and does not provide, as in prior art systems, repeatable and reproducible values from which a cinematographer/director of photography could order the color correction of the film in a manner understood by a color correction specialist or "timer".

SUMMARY OF THE INVENTION

The present invention advantageously provides a method, apparatus and system for providing reproducible digital imagery products from captured image content.

In one embodiment of the present invention a method for providing a reproducible digital imagery product from image content includes generating a respective log video signal representation of the image content, the log video signal representation having respective density values for the contrast levels of the image content. In one embodiment of the present invention, the density values of the log video signal representation include grey scale density values. In one embodiment of the present invention, the log video signal representation of the image content is color corrected by applying to the log video signal representation respective density offsets for the grey scale density values representing each of the colors of the image content.

In an alternate embodiment of the present invention, a color device includes a processor and a memory configured to generate a respective log video signal representation of received image content, the log video signal representation including respective density values for the contrast levels of the image content, and an interface configured to enable an adjustment of the density values of the log video signal representation of the image content for, in one embodiment, color correcting the image content.

In an alternate embodiment of the present invention, a system for providing a reproducible digital imagery product from image content and color correction thereof, includes a capture device for capturing the image content, a color device for generating a log video signal representation of the captured image content, the log video signal representation including respective density values for the contrast levels of the image content, and an interface configured to enable an adjustment of the density values of the log video signal representation for color correcting at least one of the log video signal representation and the image content.

BRIEF DESCRIPTION OF THE DRAWINGS

The teachings of the present invention can be readily understood by considering the following detailed description in conjunction with the accompanying drawings, in which.

Figure 1:
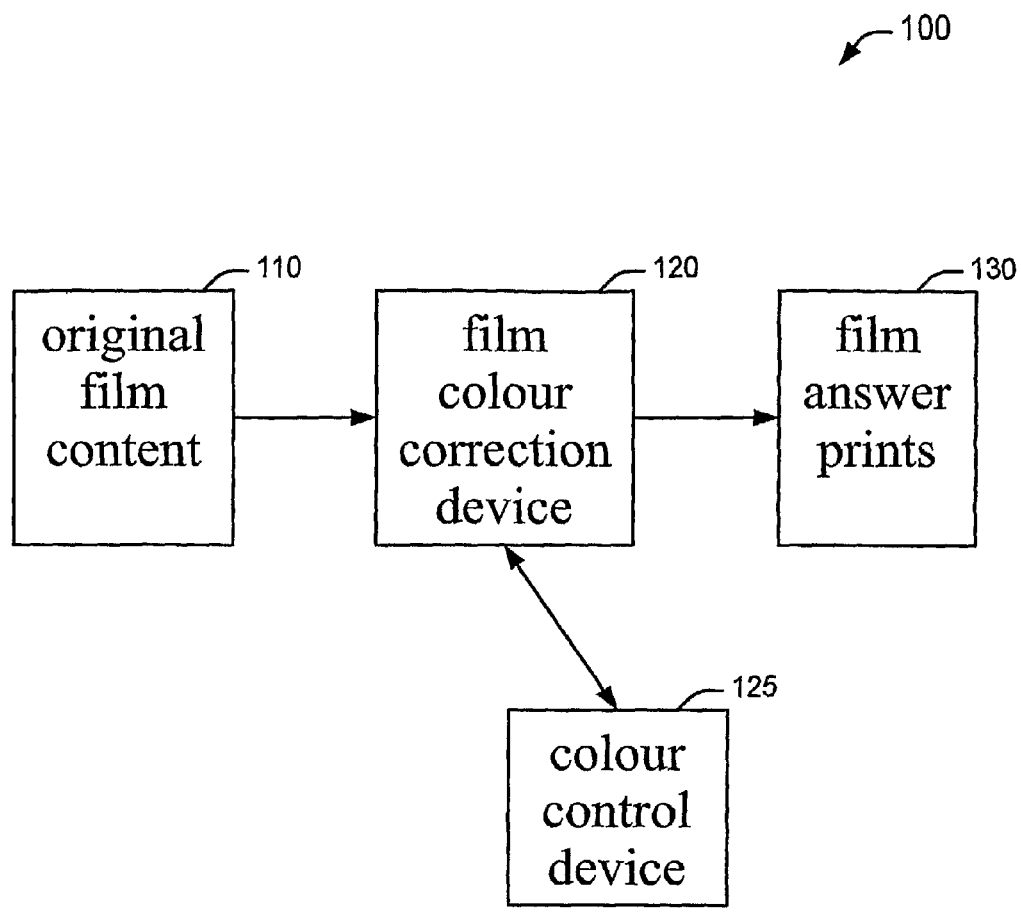
FIG. 1 depicts a high level block diagram of a prior art color correction flow process/system.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for providing reproducible digital imagery products from captured image content and for the color correction of the reproducible digital imagery products. Although the present invention will be described primarily within the context of a specific telecine color correction system and a digital color system utilizing a log video signal having grey scale density values for producing digital dailies, the specific embodiments of the present invention should not be treated as limiting the scope of the invention. It will be, appreciated by those skilled in the art and informed by the teachings of the present invention that the concepts of the present invention can be advantageously applied in substantially any system for providing reproducible digital imagery products by providing a log video signal having density value representations of the contrast levels of originally captured image content (e.g., film or video content). The concepts of the present invention can also be applied for many other applications such as the color correction of film, the re-timing of digital dailies, determining an initial starting point for a final digital intermediate and the like.

In accordance with the concepts of the present invention, a log video signal representation of original image content is generated for providing a reproducible digital imagery product of the image content. For example, the log video signal representation of the present invention comprises density values representative of the contrast levels of the full dynamic range of the image content. In accordance with the present invention, separate respective log video signal representations or density values can be provided for the color components (e.g., the red, green and blue components) of the image content. In addition and in accordance with the present invention, density offsets can be provided for, for example, each of the separated colors of the image content, to accomplish color correction or contrast level adjustments of the contrast levels of the image content. The log video signal of the present invention can contain information regarding at least the density values of the original image content on, for example, a scene by scene basis. In one embodiment of the present invention, the density values of a log video signal of the present invention can comprise grey scale density values representative of the full dynamic range of colors of the original image content. In such an embodiment, grey scale density offsets can be provided to the grey scale density values to adjust or correct the colors of the log video signal representation of the original image content. The log video signal of the present invention (e.g., the reproducible digital imagery product of the original image content) can be implemented for color correction of the original image content for, for example providing digital dailies, for the re-timing of digital dailies, for determining an initial starting point for a final digital intermediate and the like. The following will describe prior art solutions for providing dailies and several embodiments of the improved methods and systems of the present invention for providing reproducible digital imagery products from captured image content and for the color correction of the reproducible digital imagery products in accordance with several embodiments of the present invention.

For example, FIG. 1 depicts a high level block diagram of a prior art color correction flow process/system. The prior art color correction flow process/system 100 of FIG. 1 illustratively comprises an original film content block 110, a traditional film color correction device 120, a color control device 125 and a resulting film answer print block 130. In the prior art color correction flow process/system of FIG. 1, original film content 110 is fed into the film color correction device 130. In the film color correction device 130 white light is passed from a scene through dichroic filters/mirrors to split the light into its three components, red, green and blue. The three light components are used to expose a test film strip from which the densities corresponding to the intensities of the red, green and blue components of the light could be measured and compared with standard densities which correspond to an "ideal" exposure. The densities produced by the red, green and blue light components on the test film strip give an indication of the exposure given to the original film as the scene was recorded. The density information provides values typically between 0 and 50, the neutral values typically being 25, 25, 25 and correspond to the median exposure.

Figure 2:
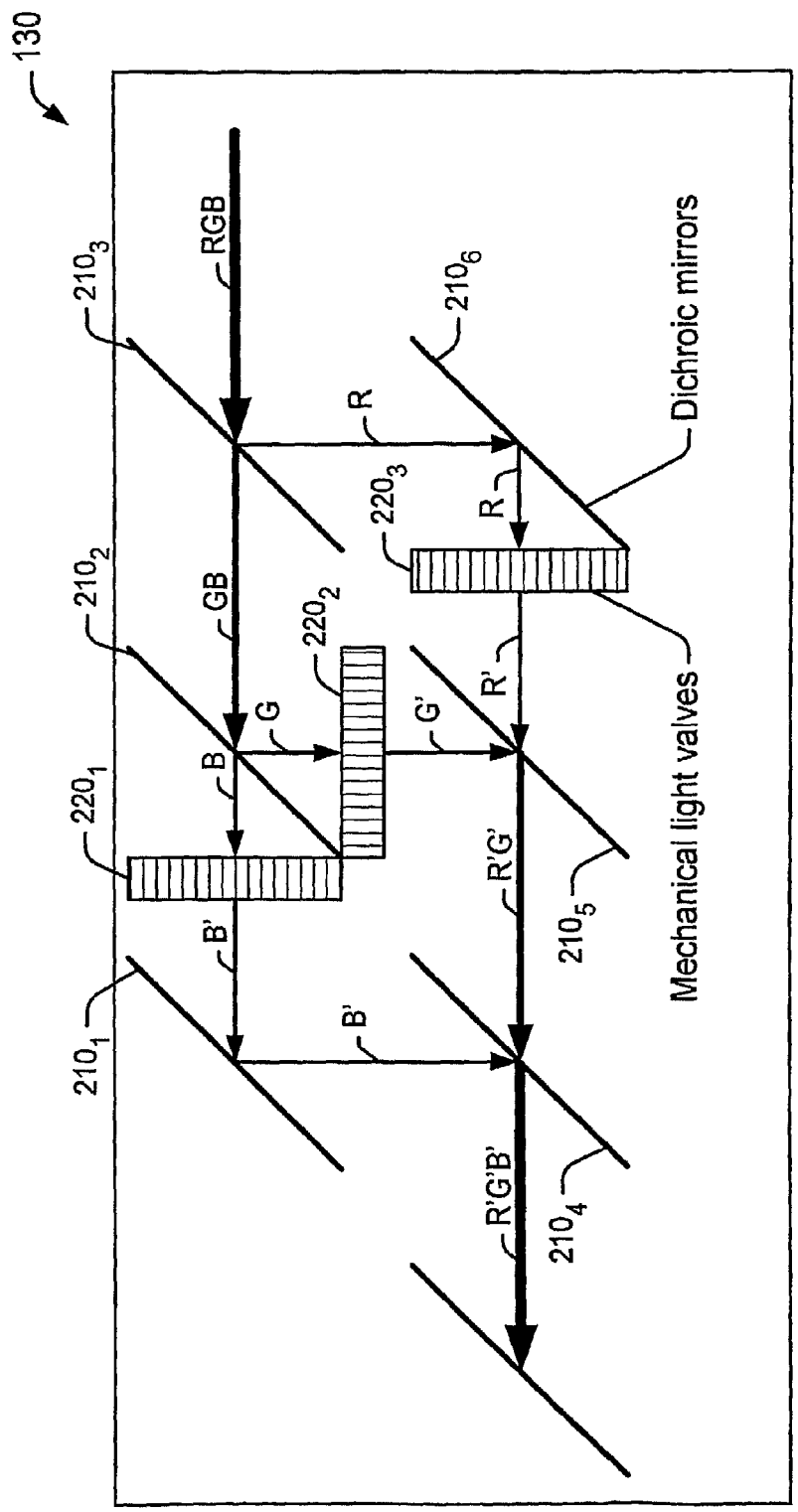
FIG. 2 depicts a high level block diagram of a film color correction device suitable for use in the color correction flow process/system of FIG. 1.

FIG. 2 depicts a high level block diagram of a film color correction device 130 suitable for use in the color correction flow process/system of FIG. 1. The film color correction device 130 of FIG. 2 illustratively comprises six (6) dichroic filters/mirrors $210_1$-$210_6$ and three mechanical light valves $220_1$-$220_3$. The six (6) dichroic filters/mirrors $210_1$-$210_6$ are implemented to split the light into its three components, red, green and blue. The three light components are then used to expose a film strip. The three mechanical light valves $220_1$-$220_3$ are used to respectively adjust the amount/density of red, green and blue light used to expose a film strip to color correct the specific scene of the film strip being illuminated. That is, a colorist (timer) via the color control device 125 adjusts the three mechanical light valves $220_1$-$220_3$ to vary the densities of the respective red, green and blue lights in a very repeatable manner, which can be recalled by a cinematographer/director of photography or the colorist (timer) to reproduce the desired color information for various scenes. The three mechanical light valves $220_1$-$220_3$, controlled by the color control device 125, provide density values typically between 0 and 50, for each of the respective red, green and blue lights such that a desired value can be determined and recalled for each of the respective, red, green and blue lights to produce a desired, very repeatable color effect for respective scenes of a film strip.

However and as previously mentioned, there is an increasing demand for motion picture negative film to be transferred directly to video such that the film is never printed as described above in the prior art color correction systems, because most film programs made specifically for television are transferred to video tape prior to showing. Furthermore, with the move toward the digital filming of content made for theatre programming, color correction as described above, also cannot not be performed on such content intended to be viewed in a theatre.

As previously described, in the digital arena telecine machines enable the transfer of film content directly to video. Video dailies resulting from the telecine transfer process are replacing the film dailies or rushes. Ordinarily, a colorist operates a telecine transfer device by adjusting the telecine settings, which include gain, gamma, lift, illumination, matching whites, and matching blacks, to enable the color correction of a scene to be captured on a video tape. As previously described however, a major drawback of all these video applications is that the video signal resulting from the telecine transfer process has to be custom processed for each application. That is, an acceptable scene reproduction is obtained from dailies created on a trial-and-error basis, which is generally time-consuming. In case the cinematographer is not pleased with the scene look on the daily, the whole process is then repeated, starting with new adjustments and ending with another telecine transfer, until the desired look is obtained. Also, the telecine transfer method typically does not offer a quantitative assessment of the film system exposure information and does not provide, as in prior art systems, repeatable and reproducible values from which a cinematographer/director of photography could order the color correction of the film in a manner understood by a color correction specialist or "timer".

To address the deficiencies of the prior art telecine transfer process and to attempt to recapture the reproducible and repeatable results of the optical color correction systems, such as the color correction system 100 of FIG. 1, the inventors provide a method, apparatus and system for the transfer of motion picture film to reproducible digital imagery.

Figure 3:
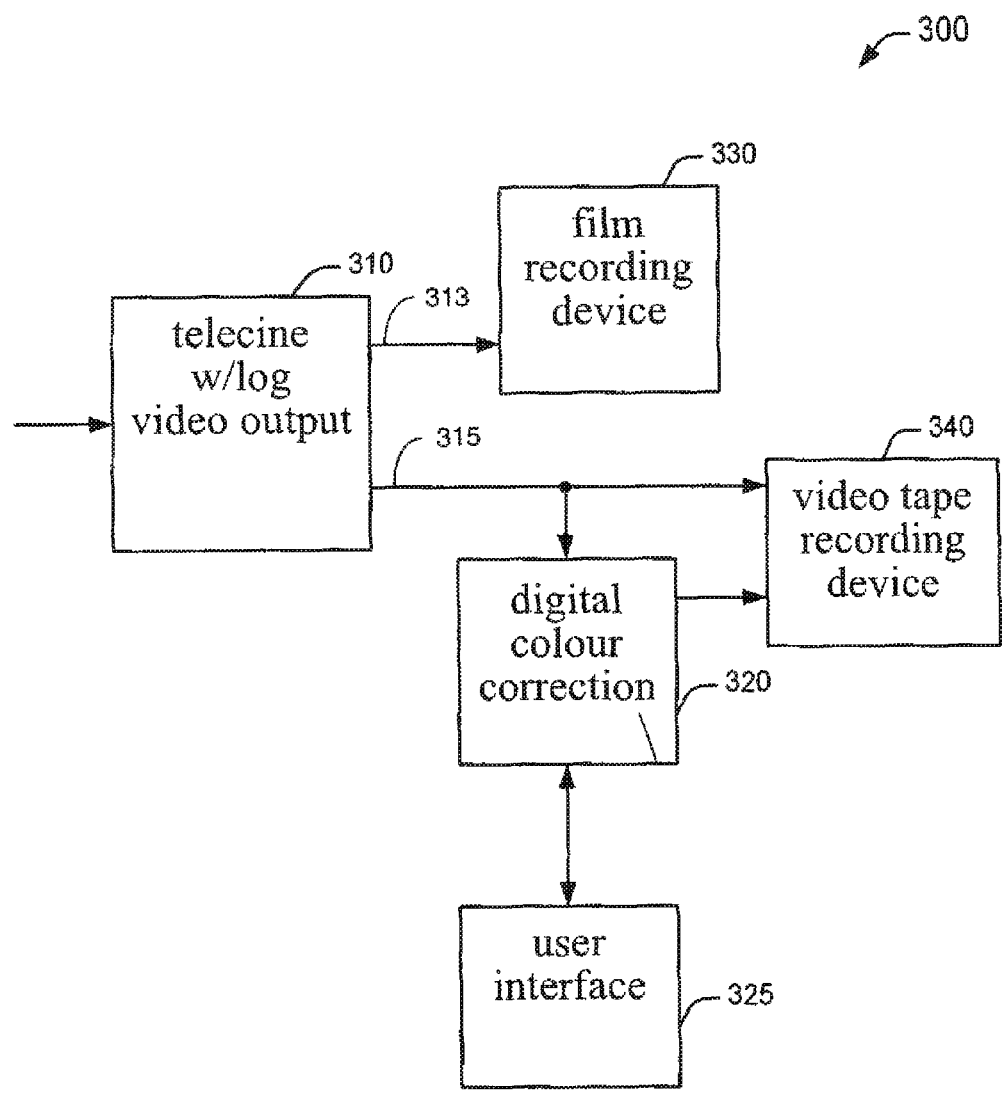
FIG. 3 depicts a high level block diagram of a telecine color system for the transfer of motion picture film to reproducible digital imagery in accordance with an embodiment of the present invention.

FIG. 3 depicts a high level block diagram of a telecine color system for the transfer of motion picture film to reproducible digital imagery in accordance with one embodiment of the present invention. The telecine color system 300 of FIG. 3 illustratively comprises a novel telecine device 310, a digital color correction device 320, a film recording device 330 and a video tape recording device 340. Alternatively, the video tape recording device 340 of the telecine color system 300 can further comprise separate storage sections (not shown) for storing a raw log video signal and a color corrected log video signal (described in further detail below). In an alternate embodiment of the present invention, a color system of the present invention can comprise a separate storage means for individually storing a raw log video signal and a color corrected log video signal. In addition, although in FIG. 3, the system of the present invention is illustratively depicted as a telecine color system 300, in alternate embodiments of the present invention, other devices and means can be implemented to generate a digital imagery representation of the received film content or to provide full dynamic range scanning of received film content in accordance with the present invention.

In the telecine color system 300 of FIG. 3, original film content is fed into the modified telecine device 310. The telecine device 310 provides full dynamic range scanning of the received film content. In addition, in one embodiment of the present invention the scanning of the telecine device 310 provides separate red, green and blue components of the received film content.

Figure 4:
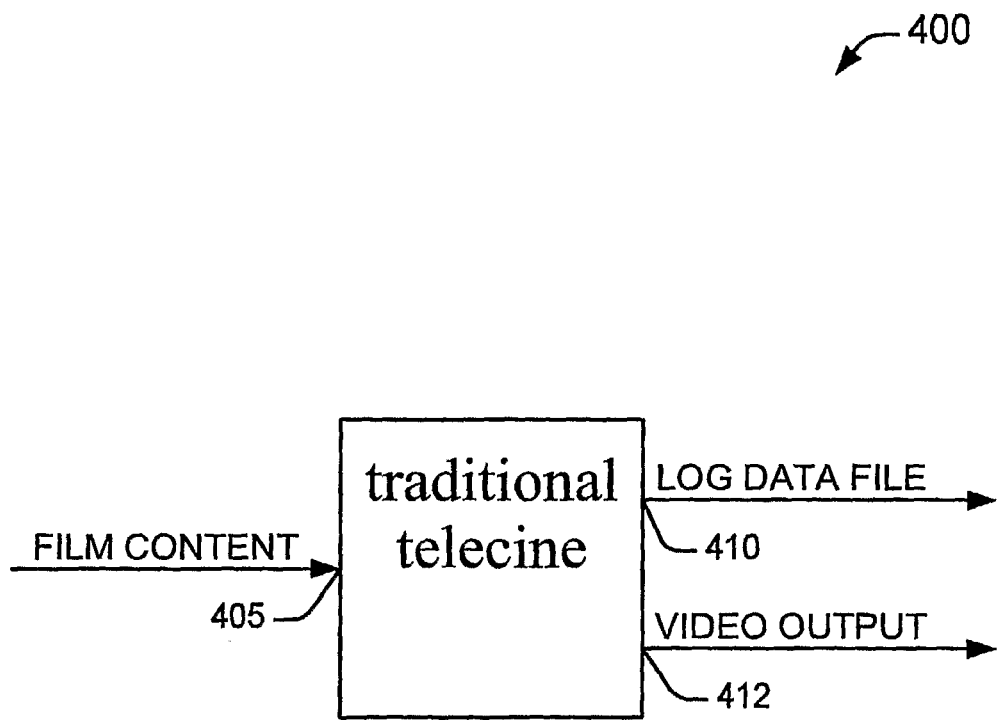
FIG. 4 depicts a high level block diagram of a prior art telecine device.

FIG. 4 depicts a high level block diagram of a prior art telecine device 400. The telecine device 400 of FIG. 4 comprises an input 405 for receiving film content and two output ports 410 and 412. The prior art telecine device 400 receives original film content and provides scanning. The first output port 410 of the prior art telecine device 400 provides a 10 bit Log data file (e.g., TIF file or DPX file). The second output port 412 of the prior art telecine device 400 provides a traditional video image output.

In contrast to the prior art telecine device 400 of FIG. 4, the novel telecine device 310 of the telecine color system 300 of FIG. 3 of the present invention comprises a Log video output. More specifically, the novel telecine device 310 of the telecine color system 300 of FIG. 3 comprises an input 311 for receiving film content and two outputs 313 and 315. The first output port 313 of the telecine device 310 provides a 10 bit Log data file (e.g., TIF file or DPX file). The second output port 315 of the telecine device 310 of the present invention provides a real time log video output. More specifically, the first output port 313 of the telecine device 310 of the present invention provides a 10 bit Log data file. The 10 bit Log data file contains information regarding at least the grey scale values of the scanned film content on, for example, a scene by scene basis. The data file of the first output port 313 is communicated to the film recording device 330. The data file output of the first output port 313 is a slow output signal.

In the telecine device 310 of the present invention the second output port 315 is used as a pipeline (transport device) for an intrinsically log video signal. That is, the second output port 315 of the telecine device 310 of the present invention outputs a log video signal representation of the received film content that contains grey scale values of the scanned film content on, for example, a scene by scene basis, like the first output port 313, however, unlike the data from the first output port 313, the log video signal provided by the second output port 315 is a real-time log video signal and not a file like on the first output port 313 data port. The log video signal provided by the second output port 315 is communicated to the digital color correction device 320 and to the video tape recording device 340 for recording. As described above, the video tape recording device 340 can comprise separate storage sections (not shown) for storing a raw log video signal and a color corrected log video signal. The log video signal provided by the second output port 315 comprises a low resolution and low compression signal, which is acceptable for producing digital dailies on the video tape recording device 340. The resulting video images can then be displayed either on a digital projector or monitor (not shown).

More specifically, the digital values in the video pipeline are substantially the same as the digital values in the first output port 313 of the telecine device 310 (data pipeline). As such, not only can the same image processing be applied to the signals from both, the first output port 313 and the second output port 315 of the telecine device 310, but any manipulations applied to the "video" signal during the dailies process as described above, can be automatically applied to the "data" images later in the digital intermediate process with substantially identical results. However, it should be noted that "video" workflow from the second output port 315 runs in real time with minimal resource overhead, whereas the "data file" workflow the first output port 313 nominally runs in less, than real time and requires disk space and computer resources. As such, in various embodiments of the present invention, the video pipeline of the present invention is used for dailies, where time is of the essence, and "final film" quality is not a requirement, and the data workflow of the present invention is used for the "film quality" final color correction, where more time and computer resources can be allocated.

In the telecine color system 300 of FIG. 3, the color correction device 320 provides digital color correction for the log video signal provided by the second output port 315 of the telecine device 310. That is, in one embodiment of the present invention, the scanning of the telecine device 310 provides separate red, green and blue components of the received film content. As such, the mapping and density between the separated colors is known from scanning. Using the known densities between the colors, the color correction device 320 provides digital color correction by providing density offsets for each of the separated colors.

In one embodiment of the present invention, the color correction device 320 can comprise a user interface 325 for providing a user with a means for providing density offsets for each of the separated colors to accomplish color correction or adjustments. The user interface 325 of the color correction device 320 can comprise wireless remote controls, pointing devices, such as a mouse or a trackball, voice recognition systems, touch screens, on screen menus, buttons, knobs and the like. In addition, the user interface 325 can be provided directly on the color correction device 320 or on a remote panel or device. As such, digital color correction or adjustments can be made to the individual color components of the digitally scanned original film content via the provided user interface 325. Such offsets can be linear offsets and can be configured to emulate the Printer Light correction of prior art analog color correction devices. For example, in one embodiment of the present invention, the linear density offsets can be configured to provide values typically between 0 and 50 to emulate the prior art analog Printer Light offset values. As such, and because the log video output of the novel telecine device of the present invention comprises at least grey scale values and information of the original film content on, for example a scene by scene basis, the telecine color system of the present invention is able to provide reproducible digital imagery products (e.g., dailies) which offer a quantitative assessment of the film content exposure information and provide, as in prior art systems, repeatable and reproducible values from which a cinematographer/director of photography could order the color correction of the film content in a manner understood by a color correction specialist or "timer". Furthermore, because in several embodiments of the present invention, the color corrected log video signal (e.g., digital dailies) are recorded on tape, the recorded video can be replayed again for further color correction or adjustment and such a process eliminates the need for the original film content to be rescanned or processed again to adjust a previously determined color correction or to determine an entirely new color correction.

In an alternate embodiment of the present invention, if digital dailies are wanted as data files instead of on tape as described above, then data files provided by the first output port 313 of the telecine device 310 of the present invention can be used to provide the digital dailies as files, however the process would take longer. In such embodiments of the present invention, the data files from the first output port 313 of the telecine device 310 would be first communicated to the color correction device 320 for color correction as described above.

In addition to providing log video signals for the purposes of creating digital dailies recorded by the video tape recording device 340, the telecine color system 300 of the present invention can be used to determine an initial starting point for a final digital intermediate. That is, for the concepts of the present invention to be used directly for color correction, the "full range" calibration which was used during the dailies process must match the "full range" calibration used for scanning the negative for the digital intermediate. The physical dailies are not used as source material for the digital intermediate because the physical dailies media has the look of the dailies already preserved (e.g., "baked in"). The original uncorrupted source acquisition material, must be used (i.e., the original camera negative which was scanned at full dynamic range) as the starting point for the digital intermediate.

More specifically, the telecine color system 300 of the present invention can be used to color correct an entire original film content for release prints. Unlike in previous digital telecine devices used for color correction where a video signal resulting from the telecine transfer process has to be custom processed for each application, the information used in the color correction of a telecine color system of the present invention, specifically the grey scale values in the log video signal of the present invention used to create the digital dailies, can be used as a starting point or a reference point for a final color correction or adjustment of the entire original film content. That is, in accordance with the present invention, if the full range video signal is captured on, for example, a video tape (i.e., a separate recording section of the video tape recording device 340) during the dailies process as described above, (before any initial color correction had been applied), then additional "creative" color corrections could be applied to this "raw full-range" capture without having to re-telecine the film. This provides the creative types (e.g., the director and/or cinematographer) with additional opportunities during post-production stages to re-visit and modify the "look" of each shot, no longer being locked in and limited by the initial look imposed during the dailies process.

Even further, there are many low-budget productions and independent films which, for financial reasons, perform final color correction via a "video" workflow. If in accordance with the present invention, the film negative is telecined in "full range log" video, as described above, then the entire latitude of the negative would be available for further creative modification during the color correction process.

The concepts of the present invention further includes printer lite emulation. That is, during a "digital intermediate" color correction session, a full range scan of the negative is color corrected, and the resulting image is displayed either on a digital projector or monitor. The top digital intermediary facilities have the ability (as result of lots of color science and really good sets of eyes) to display this image so that it substantially matches a final film print. As such, if the allowable color corrections are restricted to be the same manipulations that occur at a color lab through printer lites, a successful emulation is accomplished. A big problem of prior art printer lite emulation was that the full range scanning of a film negative was time consuming, and beyond the capability of telecine hardware. However, recent advances in technology allow for a full range logarithmic signal to be achieved—but this requires extremely critical calibration of the scanning/telecine system. As such, the combination of carefully calibrated full range telecine hardware, color correction algorithms that reproduce "printer lite" manipulations, and an accurate "film print colorimetry" emulation for HD monitor displays, results in an "hd dailies" system that can accurately reproduce the precise results obtainable through traditionally lab printer light film dailies in accordance with the present invention. With the principles of the present invention, once again, a director of photography (dp) is able to call lites, receive meaningful information as to the exposure on the negative, and insure that the dailies are a product of his creative decisions.

In various embodiments of the present invention the printer lite emulation of the present invention is calibrated to a specific lab, so calling a particular set of lites matches calling the same lites at a specific lab. However, there is nothing to prevent a system in accordance with the present invention to be calibrated with any other specific laboratory's printer lites.

Figure 5:
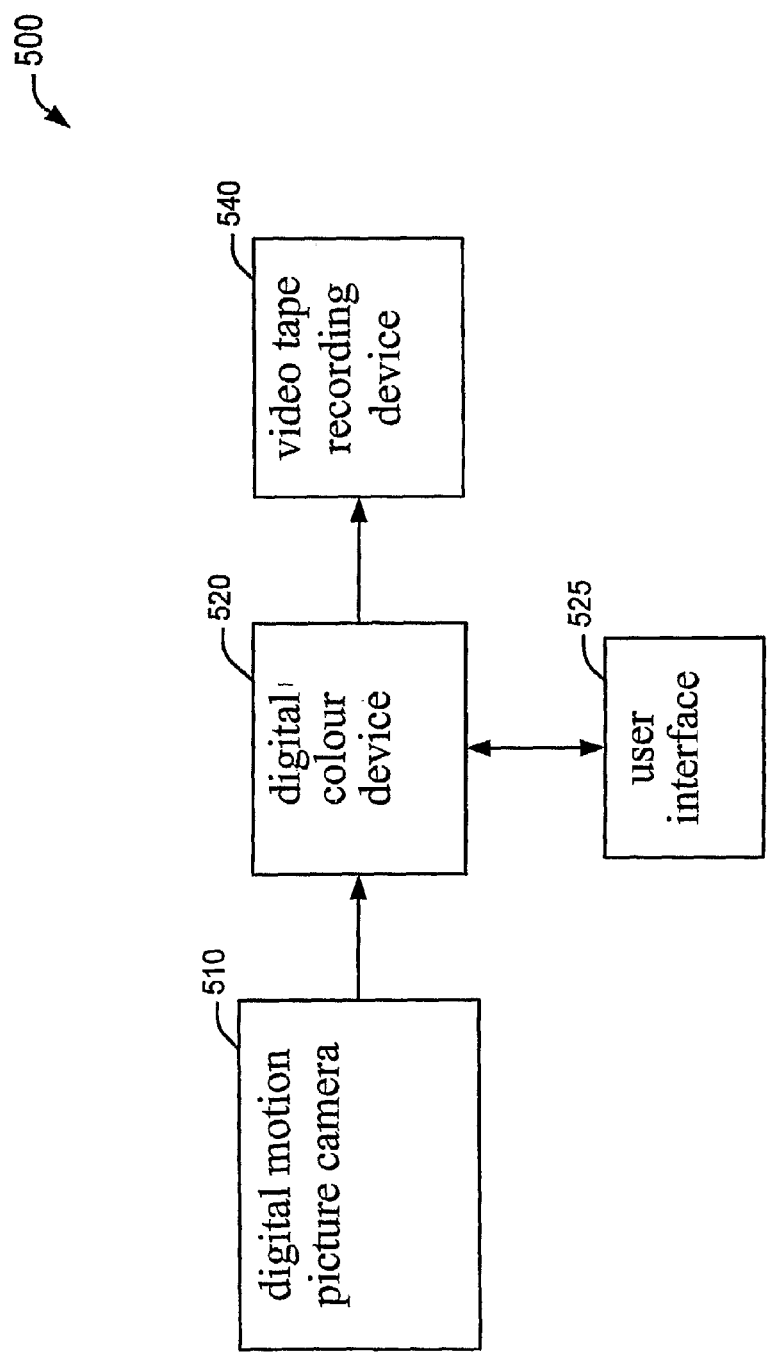
FIG. 5 depicts a high level block diagram of a digital color system for the transfer of digitally captured video content to reproducible digital imagery in accordance with an alternate embodiment of the present invention.

FIG. 5 depicts a high level block diagram of a digital color system for the transfer of digitally captured images to reproducible digital imagery in accordance with an alternate embodiment of the present invention. The digital color system 500 of FIG. 5 illustratively comprises a digital image capture device (illustratively a digital motion picture camera) 510, a digital color device 520, and a video tape recording device 540. Alternatively, the video tape recording device 540 of the digital color system 500 can further comprise separate storage sections (not shown) for storing a raw log video signal and a color corrected log video signal (described in further detail below). In an alternate embodiment of the present invention, a digital color system of the present invention can comprise a separate storage means for individually storing a raw log video signal and a color corrected log video signal. In addition, although in FIG. 5, the system of the present invention is illustratively depicted as a digital color system 500 including a digital motion picture camera as the capture device, in alternate embodiments of the present invention, other devices and means can be implemented to digitally capture the desired video content.

In the digital color system 500 of FIG. 5, original video content is captured by the digital motion picture camera 510. The digitally captured video content is communicated to the color device 520. The color correction device 520 is implemented to generate a reproducible digital imagery product (e.g., log video signal representation) of the digitally captured video content from the digital motion picture camera 510 and to provide color correction for the generated reproducible digital imagery product. In one embodiment of the present invention the generated, reproducible digital imagery product from the color device 520 is communicated to the video tape recording device 540 both in raw form and in color corrected form. In addition, in the digital color system 500 of FIG. 5, a display conversion can be applied so that the digital imagery product (e.g., log video signal) is able to be viewed onset on a calibrated display device (not shown). The display conversion corrects the digital imagery product such that it can be displayed on a calibrated display device such that the image on the display matches what a final film print would look like if that same color correction would be applied during a final digital intermediate color correction process. That is, the of the on set color correction which produced the desired look on the calibrated display device is later applied to the raw log video signal to produce dailies, editorial, and preview elements which match what was displayed on set. The preliminary color correction can also be used as a starting point for the final digital intermediate color correction.

Figure 6:
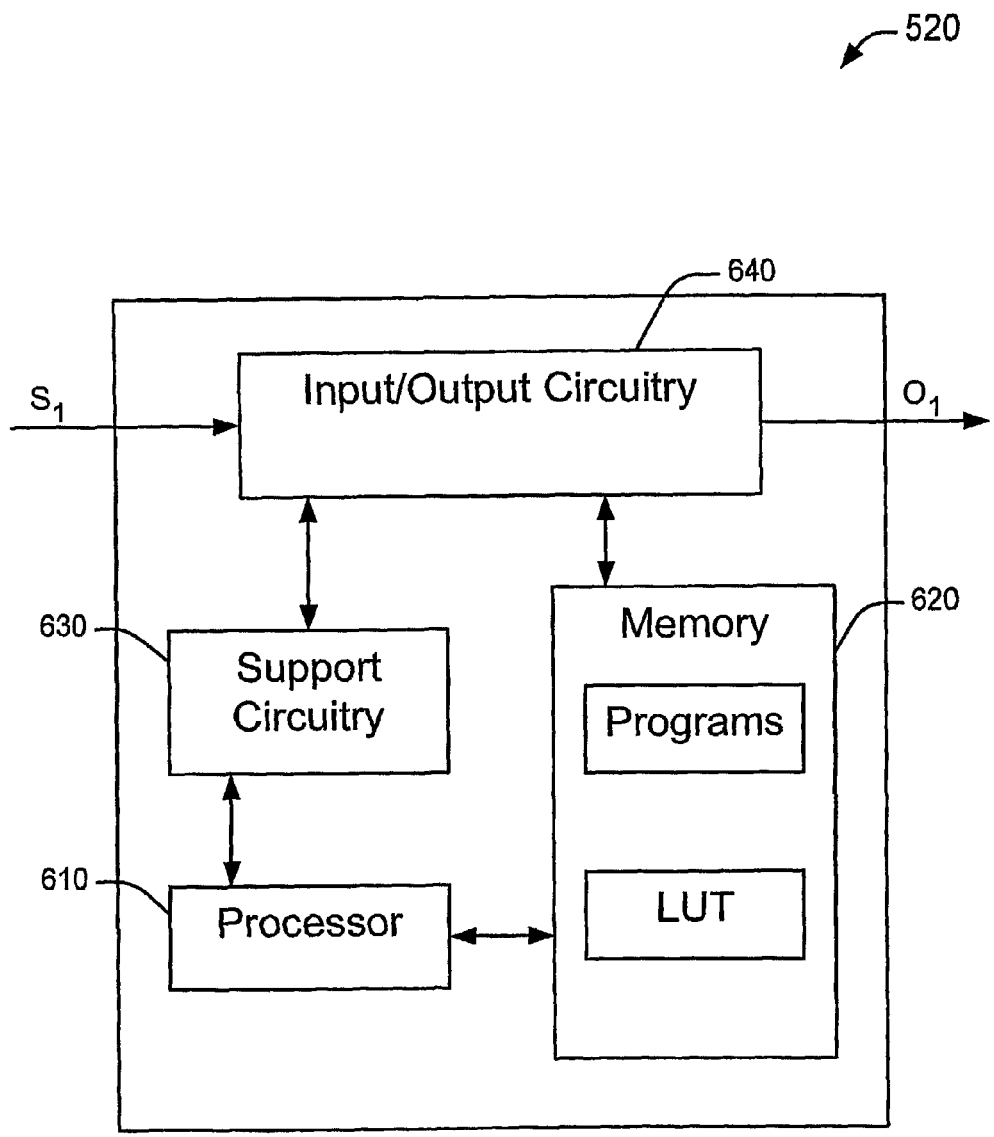
FIG. 6 depicts a high level block diagram of an embodiment of a color device suitable for use in the digital color system of FIG. 5 in accordance with the present invention.

FIG. 6 depicts a high level block diagram of an embodiment of a color device 520 suitable for use in the digital color system 500 of FIG. 5 in accordance with the present invention. The color device 520 of FIG. 6 comprises a processor 610 as well as a memory 620 for storing control programs, density charts, look-up tables (LUTs) and the like in accordance with the present invention. The processor 610 cooperates with conventional support circuitry 630 such as power supplies, clock circuits, cache memory and the like as well as circuits that assist in executing the software routines stored in the memory 620. As such, it is contemplated that some of the process steps discussed herein as software processes may be implemented within hardware, for example, as circuitry that cooperates with the processor 610 to perform various steps. The color device 520 also contains input-output circuitry 640 that forms an interface between the various functional elements communicating with the color device 520. For example and as depicted in FIG. 5, the color device 520 communicates with the motion picture camera 610 via a first, input path S1 and communicates with the tape recording device 540 via a second, output path O1.

Although the color device 520 of the present invention is depicted as a general purpose computer that is programmed to perform various control and program functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to FIG. 5, the digitally captured video content from the motion picture camera 510 is communicated to the color device 520. In a first embodiment of the present invention, at the color device 520 a log video signal representation of the digitally captured video content is generated using, for example, dynamic range information of the captured video content. For example, a log video signal comprising grey scale density values for the digitally captured video content is generated in the color device 520. More specifically, information regarding the dynamic range of the digitally captured video content is used by the color device 520 of the present invention to map a full range of the grey scale density values of the log video signal to the dynamic range of the specific digital video content captured by the motion picture camera 510. In one embodiment of the present invention, the color device 520 can determine the dynamic range of the digitally capture video content or alternatively, can receive information regarding the dynamic range of the captured video content from the motion picture camera 520. Alternatively, a color device 520 of the present invention can generate a signal to cause a message to be displayed to a user on, for example the motion picture camera 510 or an associated display, which requests required information regarding the dynamic range of the digitally captured video content.

Furthermore, the color device 520 of the present invention can separate the received digital video content into color components such as red, green and blue components. As such, mapping can be performed to provide respective grey scale densities for the separated colors. In accordance with the present invention, the range of the grey scale density values of the log video signal generated by the color device 520 is projected across the dynamic range of the video content captured by the digital motion picture camera 510. Using the known densities between the colors, the color device 520 can provide digital color correction by providing density offsets for at least one or each of the separated colors as will be described in greater detail below.

In an alternate embodiment of the present invention, at the color device 520 a log video signal representation of the digitally captured video content is generated using, for example, dynamic range information of the motion picture camera 510. For example, a log video signal comprising grey scale density values for the digitally captured video content is generated at the color device 520. More specifically, information regarding the dynamic range of the motion picture camera 510 is used by the color device 520 of the present invention 40 map a full range of the grey scale density values of the log video signal to the dynamic range of the specific motion picture camera 510 used to digitally capture the video content. In one embodiment of the present invention, the motion picture camera 510 can have stored information regarding its dynamic range from, for example, previously performed tests.

For example, a series of exposure tests can be run on a specific camera before its use in production. The exposure tests can be shot over a wide range of exposures to insure the full dynamic range of the camera is characterized. A physical chart currently used is a backlit transmissive glass plate with 13 discreet patches at increments of 1 f-stop. Such a chart is exposed over the range of f-stops on the camera lens—typically at least 6 f-stops. From the resulting frames, a mapping from camera output digital code values to "relative scene intensity" is derived. In one embodiment of the present invention, this mapping is concatenated with a "relative scene intensity" to "canonical log code value" table which corresponds to a what a perfectly scanned idealized camera original film negative would have produced if it had photographed the same chart. As such, the output of any digital camera can be characterized as if a scene had been captured with a "canonical" negative film stock and then that negative scanned.

Alternatively, a color device 520 of the present invention can generate a signal to cause a message to be displayed to a user on, for example the motion picture camera 510 or an associated display, which requests required information regarding the dynamic range of the motion picture camera 510. In such embodiments, the information regarding the dynamic range of the motion picture camera 510 can be communicated to the color device 520 of the present invention such that the color device 520 is able to assign corresponding grey scale density values to the full dynamic range of colors of the motion picture camera 510 to generate a respective log video signal representation of the digitally capture video content. Alternatively, a color device 520 in accordance with the present invention can have information stored regarding the dynamic range of various digital capture devices, including the motion picture camera 510.

In accordance with the embodiment of the present invention described directly above, in the color device 520, the range of the grey scale density values of the log video signal is projected across the dynamic range of an image capture device (e.g., the motion picture camera 510). As such, subsequent images captured by the same image capture device will be respectively represented by the log video signal and as such by the grey scale density values. With such an arrangement, similar color values in different captured images will have corresponding grey scale density values which will be consistent throughout the dynamic range of a specific image capture device (e.g., the motion picture camera 510 of FIG. 5). As previously described above, the color device 520 of the present invention can separate the received, digital video content into color components such as red, green and blue components. As such, mapping can be performed to provide respective grey scale densities for the separated colors. Using the known densities between the colors, the color device 520 can provide digital color correction by providing density offsets for any or each of the separated colors as will be described in greater detail below.

In accordance with the concepts of the present invention, substantially any image capture device can be calibrated using information regarding its dynamic range such that subsequent images captured by the same image capture device will be respectively represented by a log video signal of the present invention and as such by the grey scale density values of the log video signal.

In accordance with an alternate embodiment of the present invention, at the color device 520 log video signal representations of digitally captured video content are generated using fixed grey density values for specific colors, however, taking into account the dynamic range information of either a broadest range video content to be captured or a broadest range image capture device or both. More specifically, information regarding the dynamic range of a broadest range image capture device (e.g., motion picture camera) or a broadest range video content to be captured (e.g., motion picture) is used by the color device 520 of the present invention to map a full range of the grey scale density values of the log video signal to specific colors such that the full range of the grey scale density values encompass a broadest dynamic range required for all applications and combinations of a broadest range image capture device and a broadest range video content to be captured (i.e., grey scale density values available for any color able to be captured by any image capture device or for any color in any digitally captured video content).

In one embodiment of the present invention, available motion picture cameras can have stored information regarding respective dynamic ranges from, for example, previously performed tests. Alternatively, the color device 520 of the present invention can generate a signal to cause a message to be displayed to a user on, for example the motion picture cameras or an associated display, which requests required information regarding the dynamic range of a broadest range motion picture camera and/or a broadest range video content to be captured. In such embodiments, the information regarding the dynamic range of a broadest range motion picture camera or broadest range video content can be communicated to the color device 520 of the present invention. Alternatively, a color device 520 in accordance with the present invention can have information stored regarding the dynamic range of various capture devices, including the motion picture camera 510 and information regarding the dynamic range of video content to be captured. In addition, in an alternate embodiment of the present invention, the color device 520 can determine the dynamic range of a broadest range digitally captured video content or alternatively, can receive information regarding the dynamic range of the broadest range captured video content from the motion picture camera 520.

The color device 520 of the present invention can also separate received digital video content into color components such as red, green and blue components. As such, mapping can be performed to provide respective grey scale densities for any or each of the separated colors. Using the known densities between the colors, the color device 520 can provide digital color correction by providing density offsets for any, or each of the separated colors as will be described in greater detail below.

In accordance with the embodiment of the present invention described directly above, in the color device 520, grey scale density values of the log video signal are to specific colors regardless of which image capture device is being used or what video content is being captured. As such, all video content captured by substantially any image capture device will be respectively represented by the log video signal and as such by the grey scale density values. With such an arrangement, similar color values in different captured images as captured by substantially any image capture device will have corresponding grey scale density values.

As described above, using the known densities between the colors of a received digital video content, the color device 520 can provide digital color correction by providing density offsets for the grey scale density values of, for example, any or each of the separated colors of the received digital video content. Such offsets can be linear offsets and can be configured to emulate the Printer Light correction of prior art analog color correction devices for example, in one embodiment of the present invention, the linear density offsets can be configured to provide values typically between 0 and 50 to emulate the prior art analog Printer Light offset values.

In various embodiments of the present invention, specific grey scale density values of the log video signal representation of the present invention can be associated with colors of the digitally captured video content via a look-up-table (LUT). That is, in various embodiments of the present invention, (a) 3D LUT(s) can be provided in, for example, the memory 620 of the color device 520 for mapping the grey density values of the log video signal representation to respective colors of received video content. The look-up-table (LUT) which is applied to the raw digital camera data converts raw digital camera data to, in one embodiment of the present invention, canonical log.

As described above, a display conversion can be applied to the output of the color device 520 so that the digital imagery product (e.g., log video signal) is able to be viewed onset on a calibrated display device. The display conversion corrects the digital imagery product such that it can be displayed on a calibrated display device such that the image on the display matches what a final film print would look like if that same color correction would be applied during a final digital intermediate color correction process. That is, the of the on set color correction which produced the desired look on the calibrated display device is later applied to the raw log video signal to produce dailies, editorial, and preview elements which match what was displayed on set. The preliminary color correction can also be used as a starting point for the final digital intermediate color correction.

Furthermore, in accordance with the present invention, the output of the color device 520 can be used as a pipeline (transport device) for an intrinsically log video signal. That is, the color device 520 of the present invention outputs a log video signal that contains grey scale values of the received digital video content on, for example, a scene by scene basis. The log video signal provided by the color device 520 is a real-time log video signal. The log video signal provided by the color device 520 is communicated to the video tape recording device 540 for recording. As described above, the video tape recording device 540 can comprise separate storage sections (not shown) for storing a raw log video signal and a color corrected log video signal. The log video signal provided by the color device 520 comprises a low resolution and low compression signal, which is acceptable for producing digital dailies on, for example, the video tape recording device 540.

In one embodiment of the present invention, the color correction device 520 of the present invention comprises a user interface 525 for providing a user with a means for providing density offsets for each of the separated colors to accomplish color correction or adjustments. The user interface 525 of the color correction device 520 can comprise wireless remote controls, pointing devices, such as a mouse or a trackball, voice recognition systems, touch screens, on screen menus, buttons, knobs and the like. In addition, the user interface 525 can be provided directly on the color correction device 520 or on a remote panel or device. As such, digital color correction or adjustments can be made to the individual color components of the digitally captured video content via the provided user interface 525. Such offsets can be linear offsets and can be configured to emulate the Printer Light correction of prior art analog color correction devices for example, in one embodiment of the present invention, the linear density offsets can be configured to provide values typically between 0 and 50 to emulate the prior art analog Printer Light offset values. As such, and because the log video output of the color device 520 of the present invention comprises at least grey scale values and information of the digitally captured video content on, for example a scene by scene basis, the digital color system of the present invention is able to provide reproducible digital imagery products which offer a quantitative assessment of the color components of the digitally captured video content and provide, as in prior art systems, repeatable and reproducible values from which a cinematographer/director of photography could order the color correction of the video content in a manner understood by a color correction specialist or "timer". Furthermore, because in several embodiments of the present invention, the color corrected log video signal (e.g., digital dailies) are recorded on tape, the recorded video can be replayed again for further color correction or adjustment and such a process eliminates the need for the originally captured video content to be processed again to adjust a previously determined color correction or to determine an entirely new color correction.

In addition to providing log video signals for the purposes of creating digital dailies recorded by the video tape recording device 540, the digital color system 500 of the present invention can be used to determine an initial starting point for a final digital intermediate. That is, for the concepts of the present invention to be used directly for color correction, the "full range" calibration which was used during the dailies process must match the "full range" calibration used for calibrating the log video signal and grey scale density values for the digital intermediate. The physical dailies are not used as source material for the digital intermediate because the physical dailies media has the look of the dailies already preserved (e.g., "baked in"). The original uncorrupted source acquisition material (raw log video signal representation) must be used as the starting point for the digital intermediate.

More specifically, the digital color system 500 of the present invention can be used to color correct an entire original video content for final versions. Unlike in previous digital devices used for color correction where a video signal resulting from a correction process has to be custom processed for each application, the information used in the color correction of a digital color system of the present invention, specifically the grey scale values in the log video signal of the present invention used to create, for example, the digital dailies, can be used as a starting point or a reference point for a final color correction or adjustment of the entire original video content. That is, in accordance with the present invention, if the full range video signal (e.g., the raw log video signal representation before any initial color correction had been applied) is captured on, for example, a video tape (i.e., a separate recording section of the video tape recording device 540) during the dailies process as described above, then additional "creative" color corrections could be applied to this "raw full-range" capture without having to re-calibrate and process the original video content. This provides the creative types (e.g., the director and/or cinematographer) with additional opportunities during post-production stages to re-visit and modify the "look" of each shot, no longer being locked in and limited by the initial look imposed during the dailies process.

Even further, there are many low-budget productions and independent films which, for financial reasons, perform final color correction via a "video" workflow. If in accordance with the present invention, the video content is calibrated in "full range log" video as described above, then the entire latitude of the video content would be available for further creative modification during the color correction process.

In various embodiments of the present invention the printer lite emulation of the present invention is calibrated to a specific lab, so calling a particular set of lites matches calling, the same lites at a specific lab. However, there is nothing to prevent a system in accordance with the present invention to be calibrated with any other specific laboratory's printer lites.

Having described various embodiments for a method, apparatus and system for providing reproducible digital imagery products from captured image content and for the color correction of the reproducible digital imagery products (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for providing a reproducible digital imagery product from image content on a color device, comprising:
generating a logarithmic video signal representation of said image content having representative density values created by separating each color in the image content and mapping densities between separated colors so as to establish corresponding contrast values for said image content, said generating being performed on the color device, which comprises a processor and a memory;
providing a logarithmic data file that includes information relating to an image content reproduced from a recorded film using a first output port, and simultaneously generating and providing real time logarithmic video signals using a second output port, said logarithmic video signals having a lower resolution and compression quality than that of said image content reproduced from the recorded film, wherein only output from said second output port is sent to a color correction device;
generating a signal that causes a message to be displayed to a user which requests required information regarding a dynamic range of digitally captured video content and providing density offsets for each separated colors to the user; and
applying the representative density values to color correct at least one of said logarithmic video signal representation of said image content and said image content.

2. The method of claim 1, wherein respective density offsets are applied to said density values to color correct at least one of said logarithmic video signal representation of said image content and said image content.

3. The method of claim 2, wherein said density offsets comprise linear offsets.

4. The method of claim 2, wherein said density offsets are configured to provide values between 0 and 50 to emulate analog printer light offset values.

5. The method of claim 1, wherein at least one of said log video signal representation and said image content are color corrected for a specific display environment.

6. The method of claim 1, wherein the density values of said logarithmic video signal representation comprise respective grey scale density values.

7. The method of claim 1, wherein said log video signal representation provides respective grey scale density values for different colors of said image content on a scene by scene basis.

8. The method of claim 1, wherein said logarithmic video signal representation is used to create dailies.

9. The method of claim 1 wherein said logarithmic video signal representation comprises a low resolution and low compression signal, which is acceptable for producing dailies.

10. The method of claim 1, wherein said logarithmic video signal representation is used as a starting point for a digital intermediate.

11. The method of claim 1, wherein said logarithmic video signal representation comprises respective density values for different colors of said image content.

12. A color device for providing a reproducible digital imagery product from image content, comprising:
a processor and a memory configured to generate a respective logarithmic video signal representation of said image content, said logarithmic video signal representation comprising respective density values for contrast levels of said image content;
an input component for receiving film content and a plurality of output ports wherein a first output port contains a logarithmic data file that contains information relating to an image content reproduced from a recorded film and a second output port containing logarithmic video signals being generated in real time simultaneously and having a lower resolution and compression quality than that of the image content reproduced from the recorded film, wherein only output from said second output port is sent to a color correction device;
an interface configured to enable an adjustment of the density values of said log video signal representation of said image content for color correcting at least one of said logarithmic video signal and said image content;
said processor and memory being further configured to generate a signal that causes a message to be displayed to a user which requests required information regarding a dynamic range of digitally captured video content, and providing density offsets for each separated colors to the user.

13. The color correction device of claim 12, wherein said interface comprises at least one of a wireless remote control, a pointing device, a voice recognition system, a touch screen, on screen menus, buttons, and knobs.

14. A system for providing a reproducible digital imagery product from image content and color correction thereof, comprising:
a capture device for capturing said image content;
a color device for generating a logarithmic video signal representation of said captured image content, said logarithmic video signal representation comprising respective density values for contrast levels of said image content such that the density values are generated by separating each color in the image content and mapping densities between separated colors;
the color device including a first output port providing a logarithmic data file that contains information relating to the image content and a second output port containing logarithmic video signals being generated in real time simultaneously and having a lower resolution and compression quality than that of the image content, wherein only output from said second output port is sent to a color correction device;
said color device further configured to generate a signal that causes a message to be displayed to a user which requests required information regarding a dynamic range of digitally captured video content and providing density offsets for each separated colors to the user; and
an interface configured to enable an adjustment of the density values of said log video signal representation of said image content for color correcting at least one of said logarithmic video signal representation and said image content.

15. The system of claim 14, further comprising a storage means for storing an adjusted logarithmic video signal representation of said image content.

16. The system of claim 14, further comprising a storage means for storing said logarithmic video signal representation from said color device before a color correction.

17. The system of claim 14, further comprising a display device for displaying a converted log video signal representation such that the image on the display device matches a final film print look.

18. The method of claim 1, further comprising modifying color densities further after receiving user input for performing further color corrections.

* * * * *